United States Patent Office 2,953,173
Patented Sept. 20, 1960

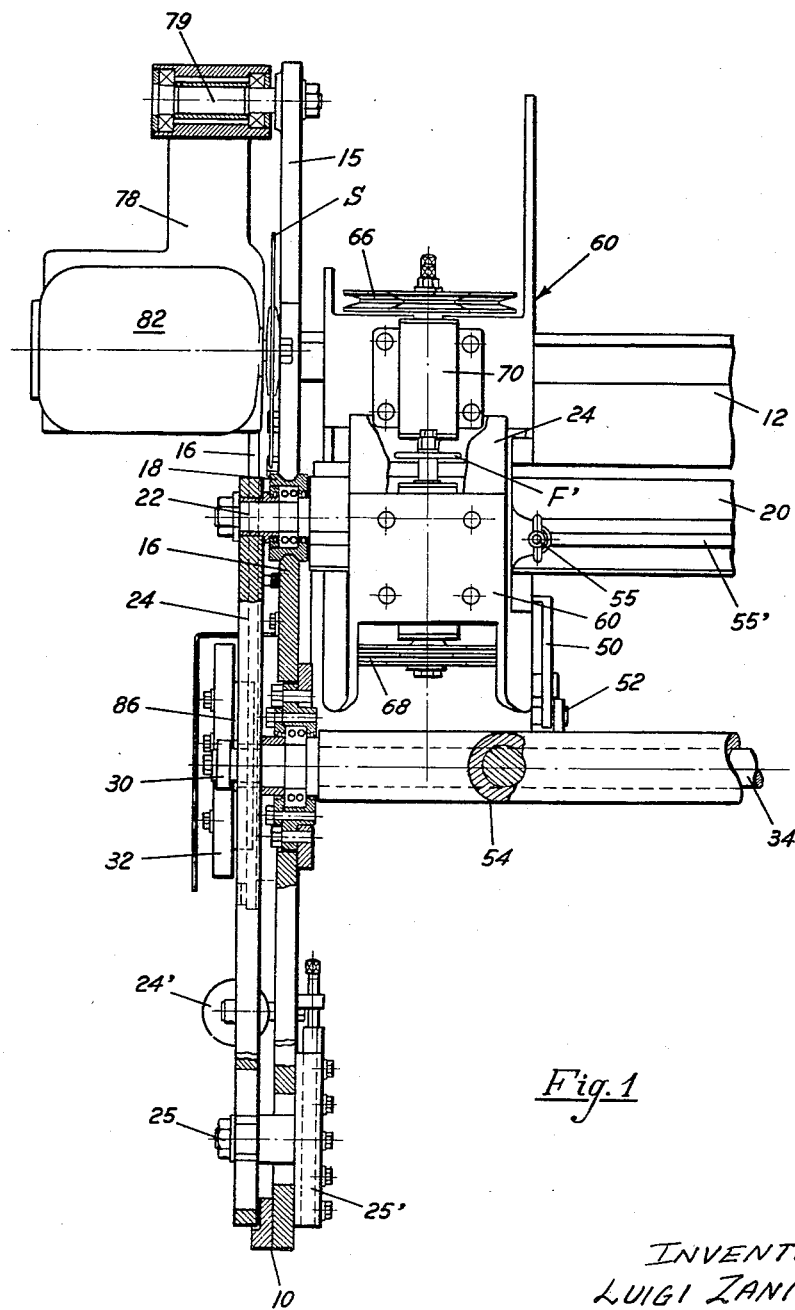

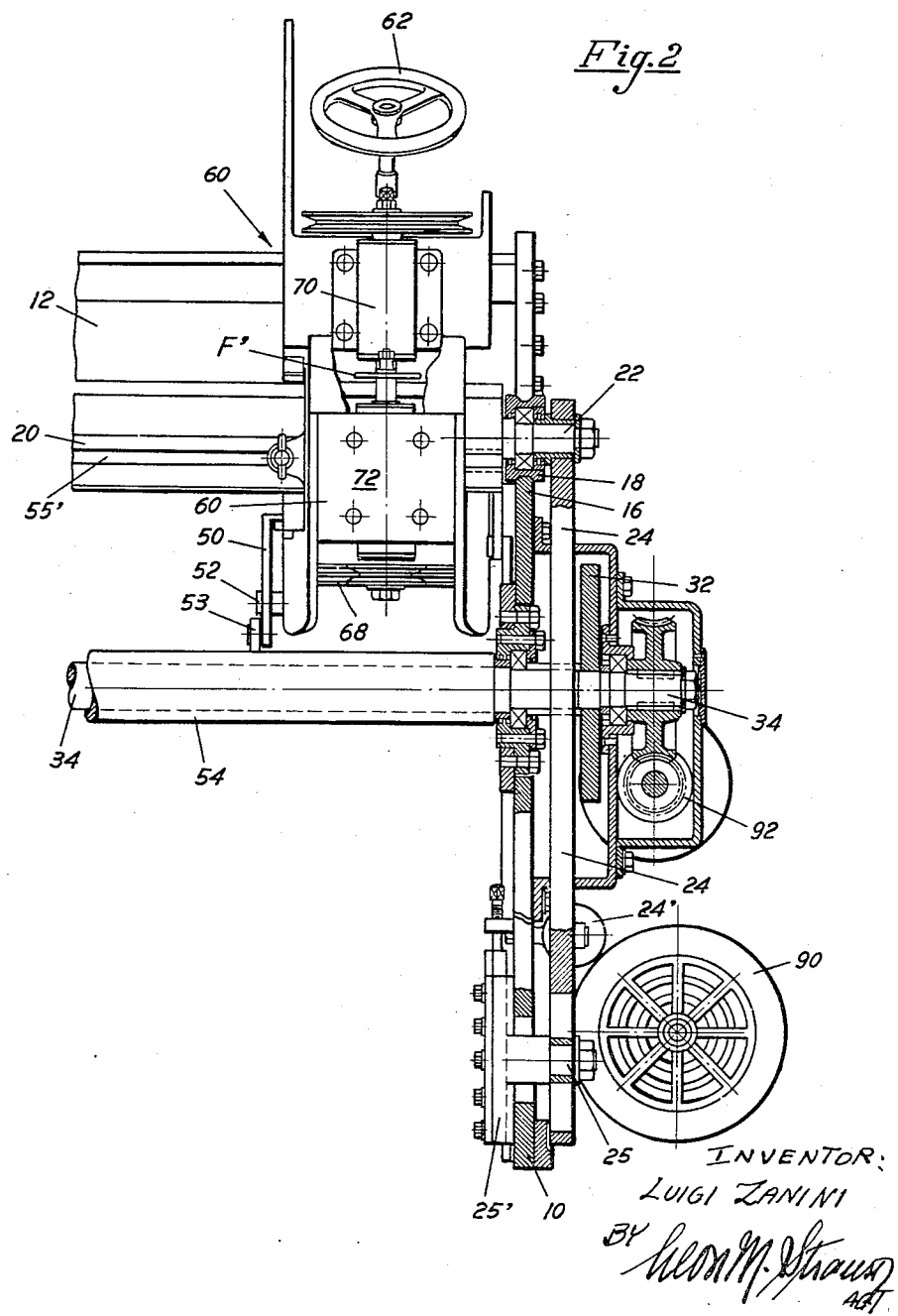

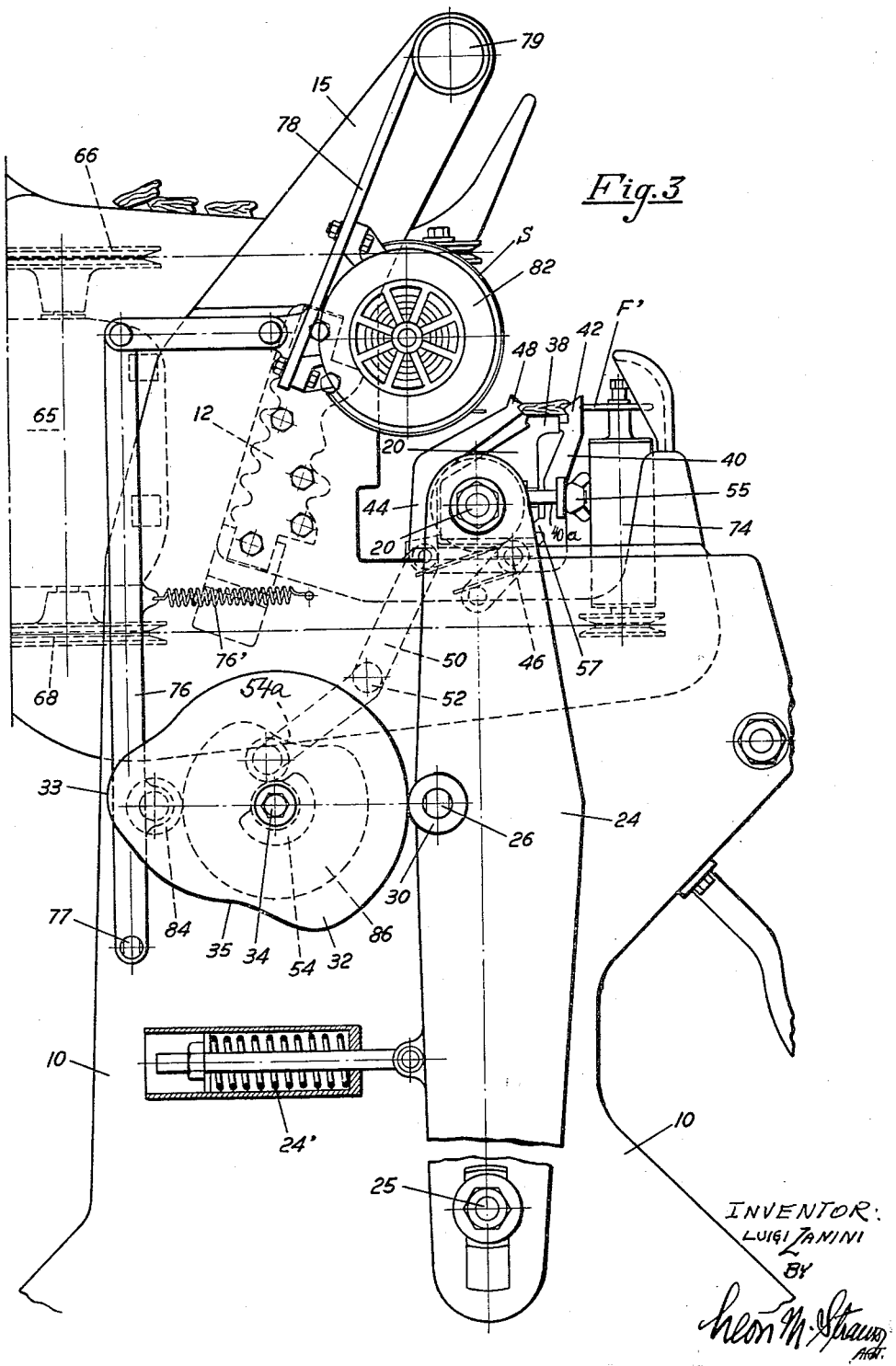

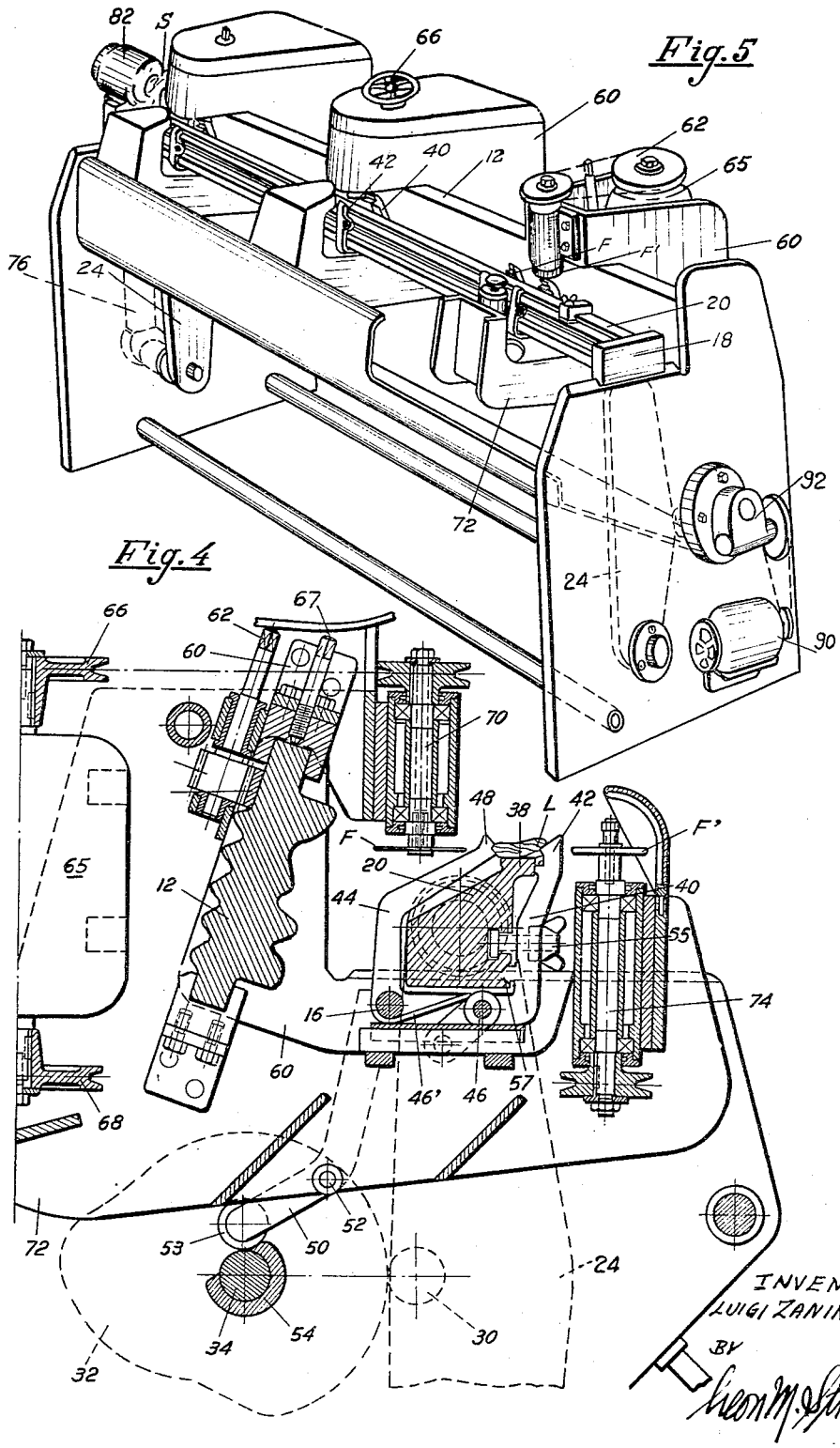

2,953,173

DEVICE FOR THE AUTOMATIC CUTTING OF SLOTS ON WINDOW SHUTTER SLATS OR THE LIKE

Luigi Zanini, 9 Via Vicolo Nuovo, San Dona di Piave, Italy

Filed Jan. 22, 1957, Ser. No. 635,469

7 Claims. (Cl. 144—136)

This invention relates to a device for automatically slotting window shutter slats or the like, thus allowing the linking elements therefor to be fitted and held therein.

In the past a number of difficulties have been present in the manufacture of window shutter slats which reduce the rate of production and consequently cause an undesirable increase in the costs of window shutter slats. It is an important object of the present invention to provide means affording due accuracy in machining of salts as required for an efficient application of mass production systems thus reducing production costs.

A further object of the invention resides in means permitting slots to be machined automatically and quickly on both faces of slats.

In addition to the above objects, the device according to the invention affords means to concurrently undertake and accomplish gauging and butting operations.

The device according to the invention comprises holding and clamping means for slats to be milled. There is further provided control means for automatically actuating the holding and clamping means in the required sequence. Supporting and guide means for the slat holding and clamping means together with means to impart a reciprocating motion to said supporting means and at least a pair of milling cutters set-up in diametrally opposite positions with respect to the slats to cut the required slots thereon are provided. Also included are drive means to drive said milling cutters and the supporting means for the slat holding and clamping means are arranged in such a manner as to allow the drive means to be actuated in a pre-established sequence.

According to the invention, a cutting tool is provided on at least one of the ends of supporting means for the slat clamping means, in order to enable slats to be gauged and butted during milling operations.

The invention is disclosed in the following description of a preferred embodiment of the invention, taken with the accompanying drawings by way of example only, and wherein:

Fig. 1 is a vertical sectional view of a device constructed according to the invention;

Fig. 2 is a vertical sectional view of the device but taken on a plane in the opposite direction from Figure 1;

Fig. 3 is an enlarged partial elevational view of the invention with parts being shown in section for detail;

Fig. 4 is an enlarged partial sectional view showing the milling cutters in detail; and Fig. 5 is a perspective view of the invention.

Referring now to the above figures, the device includes a base 10 of any suitable configuration having an upper frame provided with a horizontal cross-member 12.

The horizontal member 12 functions as a guide member, and other horizontal guides 16 are secured thereto.

The small blocks 18, slidingly fitted on the guides 16, are rigidly connected and fixed to the table 20, by which the slats L to be milled are supported. The table 20 can be slidably moved forward and backward with the blocks 18 being slidable on said guides. The table is provided with pins 22 extending outwardly from its ends and having levers 24 hinged thereto. The levers 24 are pivoted to the lower section of base 10, and each of the levers 24 is provided with a slide 26, fitted on its middle section which can be adjusted crosswise to the respective lever 24 by means of a screw 28, thereby setting as required the position in which each roller 30, fitted on one end of each of the slides 26 can be engaged with a cam 32 keyed on a shaft 34. The shaft 34 is longitudinally and parallelly arranged with respect to the table 20.

The cam 32 has a first cam surface 33, protruding with respect to a second cam surface 35.

The cam surface 33 cooperates with rollers 30, causing the table 20 to be brought to its right end stroke position (as shown in the Fig. 1), whereas the cam surface 35 causes the table 20 to be brought to its left end stroke position. Finally, when the roller 30 is engaged with other positions of the surface of the cam, the table 20 will be held in an intermediate position between both end stroke positions.

A table surface on which the slat L to be milled is supported, is formed on the upper section of the table 20. The slat L is removably held and clamped against the face 38 by a clamping device, that comprises a fixed jaw 40, secured to table 20 and longitudinally adjustable thereon. A recessed head 42 is formed on the end of the fixed jaw 40 and is shaped in such a manner as to allow the corner border of slat L to be arranged and held therein. A movable jaw 44 is rotatably fitted on a pin 46 secured to fixed jaw 42. A tooth 48 is formed in the upper section of the movable jaw 44 and engages with a longitudinal slot formed in the slat L. Thus, the slat L is clamped and held, while being milled, in the same position, independently of the thickness thereof, owing to unavoidable working tolerances.

The movable jaw is actuated by a crank lever 50 explained in detail later on, pivoted on a pin 52 which is supported on a carriage 60 which will be hereinafter described.

A roller 53, supported on the opposite end of the lever 50, is associated with the face of a cam 54 and is also keyed on the shaft 35. The cam 54 extends nearly the whole length of the shaft 35.

The jaws 40 and 44 are adjustable longitudinally on the table 20, and to such a purpose slot 40a is cut in jaw 40. The prismatic head (not shown) of a bolt 55 is engaged in a slot (not shown) in jaw 44 and the bolt extends through slot 40a, whereby the jaws 40 and 44 can be secured in a required position on the table by means of bolt 55.

A knife extension 57, as formed on the fixed jaw 40, is engaged in the other V-shaped slot. Thus, the unit formed by the fixed jaw 40 and the movable jaw 44 can be moved along the longitudinal axis of table 20 and then secured in the required position.

The levers 50 can be accordingly moved in respect to the position of the movable jaw 44, since their end rollers 53 are always engaged with the face of cam 54. The jaws 40 and 44 are moved in order to allow the slots to be milled in the proper positions on the slats L.

The cam 54 has a recessed portion 54a, and when the cam follower is engaged therein, the jaws 40 and 44 are swung open, and the table 20 is in its middle position. The recessed portion in cam 54 is angularly displaced with respect to portions 33 and 35 of cam 32.

Each of the carriages 60, slidingly fitted on the guides of horizontal cross members 12, can be actuated by means of handwheels 62, provided with a pinion 64, which engages with a rack 67, secured longitudinally in the rear portion of cross member 12 whereby, by actuation of the handwheels 62, each of the carriages 60 can be brought in the required position on the cross member 12, according to the position in which the slots are to be milled on slats L.

The carriages 60 can be locked on the cross member 12 by means of lock screws 67 with which they are provided, the ends of the lock screws 64 engaging with the upper portion of guides secured to the cross member 12.

The pulleys 66 and 68 are secured on the ends of each projecting shaft of the electric motors 65, fitted on the upper portion of carriages 60. The pulley 66 drives a vertical spindle 70, to which a milling cutter F is fitted which is provided for cutting the slots in the grooves of slats L. The spindle 70 is removably secured to the carriage 60 in such a manner as to allow the cutter F to be suitably adjusted with respect to the slat L to be slotted.

Each carriage 60 is provided with a crank cross arm 72, secured to its lower portion and directed upwards, whereby it extends underneath the table 20 and projects out of one side thereof. A second spindle 74 is adjustably secured to a vertical portion of arm 72, being thereby opposite and parallelly arranged with respect to first spindle 70. Both spindles have their shaft ends for carrying the cutters F and F′ respectively horizontally aligned, in order to have the slots milled accurately on opposite points of slats.

The second cutter F′, fitted to spindle 74, serves to cut a slot on the moulded rib of slat L. The spindle 74 is also driven by the motor 65 through the pulley 68.

It is to be thus understood that the unit as formed by the motor 65 and spindles 70 and 74, together with their cutters, can be moved as a whole along the guides of cross member 12 and locked in the position as required according to the slots to be milled in the slats.

The device includes means for the gauging and butting of slats L. A lever 76 is provided on an end of table 20 (Fig. 5) and is pivoted on the lower section of base 10. A chuck 78 is fitted on the upper end of lever 76 and carries driving motor 82, adjustably chucked therein.

A saw S or the like is driven by motor 82 in such a manner that its cutting edge can be brought in such a position as to cause interference with the extension of supporting face 38, as formed on the table 20.

A roller 84, fitted on the middle section of lever 76, acts as a follower for a cam 86, keyed on one end of shaft 34, and shaped in such a manner as to cause the saw S to be fed against the slat L when the slots are being milled thereon by the action of cutter F, whereas the lever 76, along with the related elements, is swung away from this slat, when the table 20 is in its intermediate or rest position.

The lever 76, as well as the levers 24 and all other like elements, are kept in engagement with their respective cams 86 and 32 by the action of spring means, counterweights or the like.

The cam 54 determines the position of the chuck 78, that is hinge-connected by a pin 79 to an arm 15, fitted to the upper part of the machine frame. The levers 24 controlling the bed 20 have slots 24a therein through which pins 25 extend, the pins 25 supportings slides 25′. The pins are adjustable along the axis of the levers 24 for the purpose of altering the stroke of the levers 24 since secured to the slides are return springs 24′.

The operation of the device is as follows:

Briefly, the milling cutters F, F′ are driven by each of the motors 65. The blocks 18 holding the table 20 are reciprocated through the levers 24 by the electric motor 90 which drives the cam 32. The electric motor 82 drives the saw S which serves to cut the slat L into a predetermined length. After the milling operation is finished, the table 20 is carried back to its initial position in which the jaws 40 and 44 are released so that the milled slat may be removed.

In particular when the table 20 is in a position intermediate between its end stroke positions, as shown for instance in Fig. 1, the movable jaw 44 is swung away from fixed jaw 40, thereby allowing to place the slat L to be milled, between the jaws 40 and 44.

The device is usually in operation, for instance with each motor 65 running. Each motor 65 drives a respective group of cutters F and F′. A further motor 90 through a speed reduction gear 92 formed as a helical gear drives the shaft 34 at the required speed.

After having suitably set a slat L on the face 38 of the table 20, and while the shaft 34 is running, when the most protruding portion of cam 54 has been reached by its follower 53, the movable jaw 44 is closed against the fixed jaw 40. This operation results in the automatic setting of slat L in a determined position, depending on the profile and shape shown by the heads 42 and 48 of the jaws 40 and 44, and in which the slat is clamped on its whole cross-sectional profile, and not on two of its faces only. More precisely, the slat is clamped on its groove and longitudinal rib, thus allowing the slots to be milled in the exact positions as required, for instance exactly on the bottom of the groove, and on the crest of the rib.

A further rotation of shaft 34 causes engaging of the lobe or projecting part 33 of cam 32, with the followers 30 of levers 24, whereby the table 20 is moved, thus bringing the slat L in a suitable position to have the slot milled thereon by the cutter F′.

After performing the above operation the rollers 30, by following the outline of cams 32, go past the lobes 33 into the recesses 34 of the cams 32, whereby the table 20 is moved now to the left, so that the slat is brought against the cutter F, and the opposite slots are milled.

During this latter operation, the end levers 76 are actuated by means of the cams 86, whereby the saws S, as set on the ends of table 20, at the required distance therefrom, according to the length of slat L, are brought into engagement therewith thus performing the gauging and butting operations on the slat.

During the operations as above referred to the clamping means are kept always in their closed positions, since the followers 53 are running along the lobe of cam 54.

When the rollers 30 of levers 24 come out from recessed portion 34, thus reaching the circular profile portion of cam 32, the table 20 is brought again in its middle position and kept therein for a time proportional to the angular extension of said circular portion of the cam profile. Then, the rollers 53 engage the lower arched portion of the cam 54, whereby the movable jaws 44 are swung open and the milled slat L can be removed with a further slat then set in place.

As already stated, the carriages 60 can be moved along the guides 12, according to the positions in which the slots are to be milled on the slats.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A device for automatically cutting slots in slats comprising a base, clamping means for holding a slat, supporting means pivotally mounted on said base, said clamping means being supported and guided by said supporting means, cam operated means connected to said supporting means for imparting a sliding motion thereto, at least one pair of cutters carried by said base on opposite sides of said clamping means for cutting slots in opposite sides of a slat, means for driving said cutters connected thereto, and sequential operating means cooperating with said cam operating means for actuating said clamping means in sequential relationship with respect to said cam operated means to open and close said clamping means depending upon the position of said supporting means.

2. A device according to claim 1, including slat gauging and butting means mounted on said supporting means for cutting a slat to a predetermined length and squaring the end thereof.

3. A device according to claim 1, wherein said base includes a plurality of horizontal guides, said supporting means including a table slidably mounted on said horizontal guides.

4. A device according to claim 1, wherein said clamping means includes a pair of jaws, said sequential operating means including further cam means operatively connected with said jaws for imparting a sliding motion to at least one of said jaws to sequentially clamp and release the slats.

5. A device according to claim 1, wherein said base includes a plurality of horizontal guides, said supporting means including a table slidably mounted on said horizontal guides, and means for moving said table slidably along said guides.

6. A device according to claim 1, wherein said base includes a plurality of horizontal guides, said supporting means including a table slidably mounted on said horizontal guides, means for moving said table slidably along said guides, said clamping means including a pair of jaws, said sequential operating means including further cam means operatively connected with said jaws for imparting a sliding motion to at least one of said jaws to sequentially clamp and release the slats.

7. A device according to claim 1, wherein said base includes a plurality of horizontal guides, said supporting means including a table slidably mounted on said horizontal guides, means for moving said table slidably along said guides, said clamping means including a pair of jaws, said sequential operating means including further cam means operatively connected with said jaws for imparting a sliding motion to at least one of said jaws to sequentially clamp and release the slats, and slat guaging and butting means mounted on said supporting means for cutting a slat to a predetermined length and squaring the end thereof.

References Cited in the file of this patent

UNITED STATES PATENTS

| Number | Name | Date |
|---|---|---|
| 2,312,439 | Peterson | Mar. 2, 1943 |
| 2,543,917 | Lloyd | Mar. 6, 1951 |
| 2,602,477 | Kniff | July 8, 1952 |
| 2,663,337 | Bord | Dec. 22, 1953 |
| 2,696,856 | McCoy | Dec. 14, 1954 |
| 2,725,084 | Carlson | Nov. 29, 1955 |
| 2,753,900 | Bjork | July 10, 1956 |